April 6, 1954     F. J. YOUNG     2,674,188
MULTIPLE PUMPING UNITS AND DRIVE THEREFOR
Original Filed Oct. 28, 1946     2 Sheets-Sheet 1

FORREST J. YOUNG,
INVENTOR.

BY

ATTORNEYS

FORREST J. YOUNG,
INVENTOR.

Patented Apr. 6, 1954

2,674,188

UNITED STATES PATENT OFFICE 2,674,188

MULTIPLE PUMPING UNITS AND DRIVE THEREFOR

Forrest J. Young, Los Angeles, Calif., assignor to The National Supply Company, Pittsburgh, Pa., a corporation of Pennsylvania Original application October 28, 1946, Serial No. 706,140, now Patent No. 2,576,872, dated November 27, 1951. Divided and this application January 18, 1949, Serial No. 71,531

22 Claims. (Cl. 103—5)

This is a division of my copending application for Rotary Drilling Rig, Serial No. 706,140, filed October 28, 1946, now Patent No. 2,576,872, issued November 27, 1951.

This invention relates generally to apparatus of the type used in the drilling of oil, gas, water or other wells by means of a multiple engine power plant.

An important object of this divisional application is to provide a rotary drilling rig having a pair of positive displacement reciprocating pumps for circulating mud fluid, each of the pumps being independently driven from separate engine units, together with a third engine unit connected through a power dividing device to assist in driving both pumps simultaneously.

Another object is to provide such an arrangement in which the power dividing device takes the form of a differential drive unit or a hydraulic coupling of the kinetic type.

Other objects and advantages will appear hereinafter.

Figure 1:
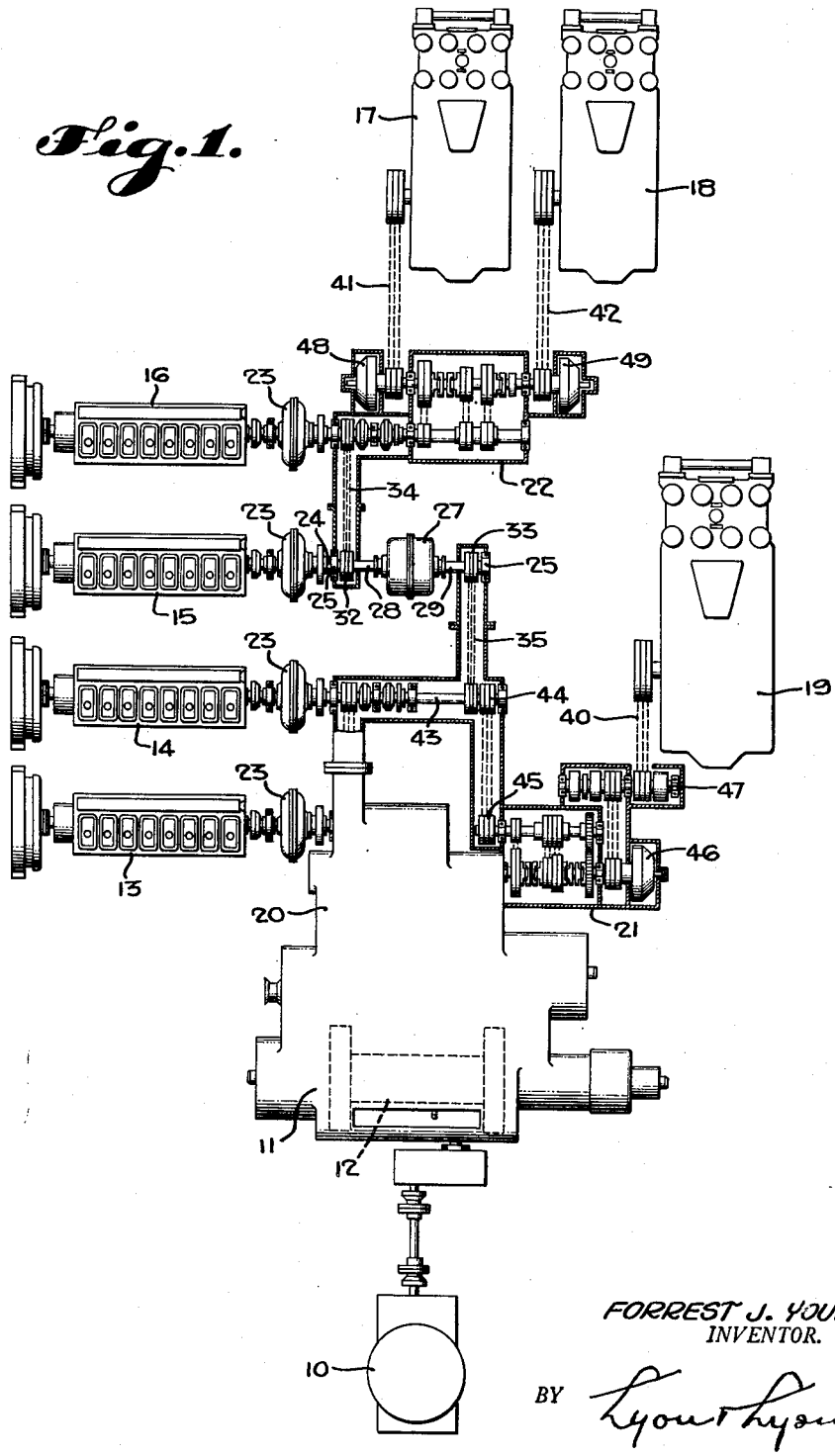
Figure 1 is a plan view in diagrammatic form showing a type of drilling rig to which the present invention pertains.

Referring to the drawings, the rotary drilling rig embodying my invention includes a rotary machine 10, a hoisting unit or drawworks 11 having a spooling drum 12, a power plant including a plurality of engine units 13, 14, 15 and 16, and a plurality of reciprocating pumps 17, 18 and 19 of the positive displacement type for circulating mud fluid in the drilling operation. Suitable transmission connections are provided for selectively driving the drawworks, rotary machine or pumps as desired. Suitable change speed transmission units 20, 21 and 22 are provided so that the speed of drive to the various driven units is flexible and may be changed when desired. Each of the engine units 13, 14, 15 and 16 may be direct connected to their output shafts, or as shown in the drawings, may drive such shafts through suitable hydraulic couplings 23.

In accordance with my invention, the shaft 24 driven by the engine unit 15 is carried on spaced bearings 25. Fixed to the shaft 24 is a central impeller unit 26. A split housing 27 is secured to this impeller unit and adapted to rotate therewith. Hydro-kinetic drive means of the Fottinger type is provided between the impeller unit 26 and the extension sleeves 28 and 29, which are rotatably mounted on the shaft 24. This drive means includes runners 30 and 31 which are secured to the extension sleeves 28 and 29 respectively. Hydraulic fluid within the housing 27 is caused to circulate in the toroidal channels formed between the double impeller 26 and the runners 30 and 31 with the result that the latter are caused to rotate when the unit 26 revolves.

In effect this device comprises a pair of hydraulic couplings interposed between the shaft 24 and the sprockets 32 and 33 which are fixed on the extension sleeves 28 and 29 respectively. When the engine unit 15 rotates the shaft 24 and the double impeller 26, the power of the engine is divided between chains 34 and 35, but the sprockets 32 and 33 may rotate at slightly different speeds and also may compensate for cyclic variations in the speed of the pumps. Clutches 36 and 37 are provided for engaging the extension sleeves 28 and 29 in direct driving relation with the housing 27 so that when the clutches are engaged the hydraulic drive is locked out and the device functions as a single integral unit.

In certain drilling operations where it is desired to pump mud fluid under very high pressure, the pumps 17 and 19 are connected for series operation so that the fluid delivered from one pump is passed into the inlet of another pump. Such conditions of operation are known in the art as compounding pumps, and this arrangement is shown clearly in the Archer Patent No. 2,282,597, granted May 12, 1942. Owing to cyclic variations in pump speeds, it is difficult to drive reciprocating pumps which are hydraulically connected in series, and therefore, considerable difficulty might be encountered in attempting to use the power of a third engine to supplement two other engines each individually driving a pump. The hydraulic coupling device shown in Figure 2 enables this power compounding operation to be more readily accomplished. The engine unit 14 may be used for driving the pump 19, while the engine unit 16 is connected to drive the pump 17. At the same time the engine unit 15 may be used to supplement the power of the engine units 14 and 16 and to divide its power between them.

Figure 2:
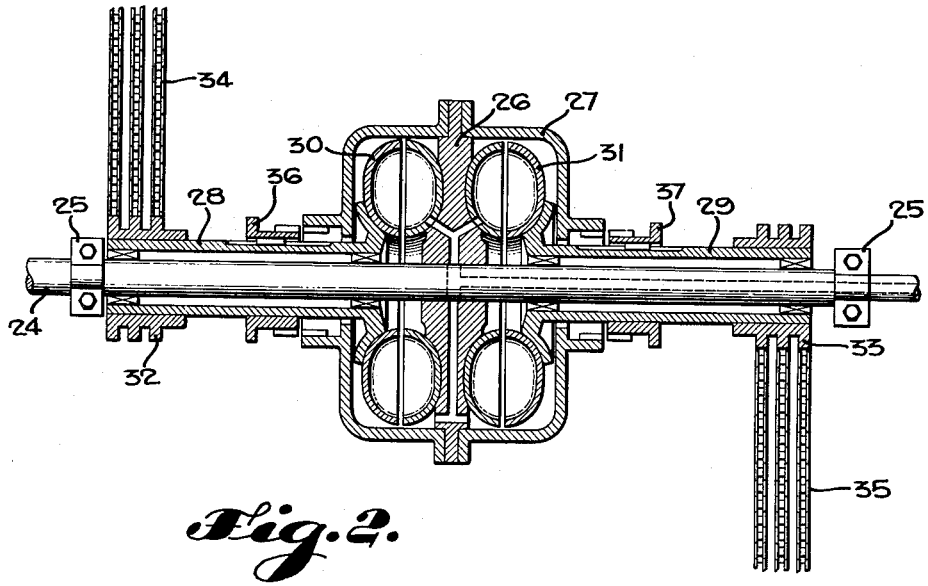
Figure 2 is a sectional plan view illustrating a hydraulic coupling of the kinetic type employed in connection with my invention.
Figure 3:
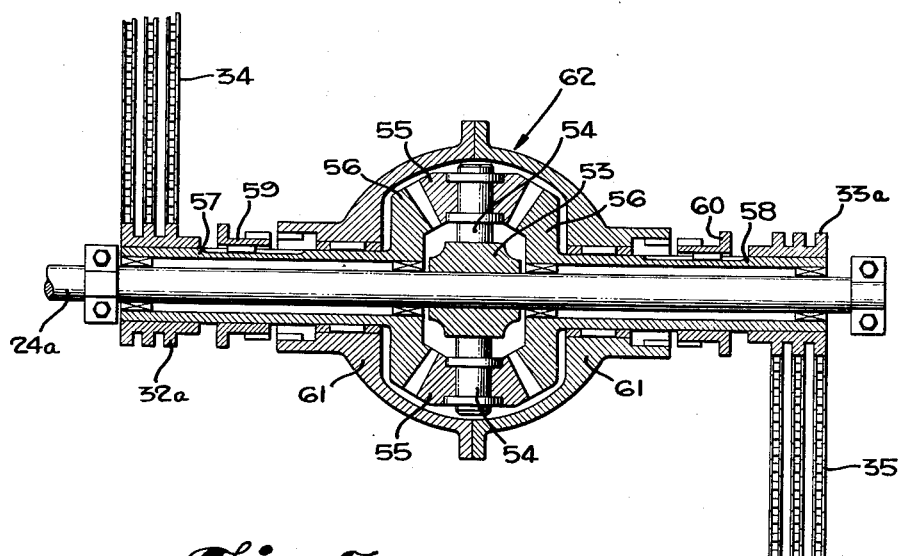
Figure 3 is a view similar to Figure 2 illustrating a modified form of my invention and employing a differential drive unit.

The engine unit 14 drives the pump 19 by way of output shaft 43, sprockets 44 and 45, change speed transmission 21, friction clutch 46, countershaft 47 and chain 40. The engine unit 16 drives either or both pumps 17 and 18 through change speed transmission 22, friction clutches 48 and 49 and chains 41 and 42 respectively. The power of the engine unit 15 is divided and acts through chains 34 and 35 to supplement the power of the engine units 16 and 14 respectively. The modification shown in Figure 3 includes an assembly which is adapted to be substituted for the shaft 24 and sprockets 32 and 33 as shown in Figure 2. The shaft 24a is arranged to be driven by the engine unit 15, and fixed to this shaft is a spider 53. A plurality of radially extending trunnions 54 on the spider each rotatably support a pinion gear 55. The pinion gears 55 mesh with driven gears 56 which are rotatably supported on the shaft 24a, and the arrangement of parts is such that a differential drive mechanism is provided between the shaft 24a and the driven gears 56. Drive sprockets 32a and 33a are fixed on the sleeve extensions 57 and 58, which in turn may be integrally formed with the gears 56 respectively.

Axially shiftable clutches 59 and 60 are provided for selectively engaging the sleeve extensions 57 and 58 respectively in driving engagement with the split housing 61. When the clutches 59 and 60 are engaged, the differential mechanism is locked out and the assembly functions as an integral unit. When the clutches 59 and 60 are disengaged, power supplied to the shaft 24a by the engine unit 15 is divided by the differential mechanism generally designated 62 so that a portion thereof drives the chain 34 and another portion drives the chain 35 in accordance with the relative resistance offered by each of these drive chains. Therefore, when the engine unit 14 is driving the pump 19 through the drive chain 40, and while engine unit 16 is operating one or both of the chain drives 41 and 42, the engine unit 15 may be used to supplement the power of the other engine units by dividing its power output through the differential mechanism 62.

Having fully described my invention, it is to be understood that I do not wish to be limited to the details herein set forth, but my invention is of the full scope of the appended claims.

I claim:

1. In combination, a pair of positive displacement pumps adapted to be connected in series flow relation, a driving shaft adapted to be connected to a source of power, a pair of driven shafts, means connecting said driven shafts respectively to said pumps, and a differential gear set connecting said three shafts.

2. Apparatus of the class described, comprising in combination a pair of reciprocating pumps of the positive displacement type each individually driven from a separate engine unit, a power dividing mechanism driven by a third engine unit and adapted to supplement the power of the other engine units, said mechanism including a pair of relatively rotatable elements each operatively connected to drive one of said pumps, said mechanism also including a third element driven from the third engine unit, and means whereby rotation of the third element serves to drive the first and second elements at variable relative speeds for compensating for cyclic variations in speed of operation of the pumps.

3. Apparatus of the class described, comprising in combination a pair of driven devices, a pair of engine units, transmission connections whereby each engine unit may individually drive one of said devices, a differential drive mechanism having three elements, the first element thereof being operatively connected to drive one of said devices and the second element thereof being operatively connected to drive the other device, and a third engine unit adapted to drive the third element of the differential mechanism whereby the power of the third engine unit may be divided to supplement that of the other engine units.

4. Apparatus of the class described, comprising in combination a pair of driven devices, a pair of engine units, transmission connections whereby each engine unit may individually drive one of said devices, a differential drive mechanism having three elements, the first element thereof being operatively connected to drive one of said devices and the second element thereof being operatively connected to drive the other device, a third engine unit adapted to drive the third element of the differential mechanism whereby the power of the third engine unit may be divided to supplement that of the other engine units, and selective means to connect the first and second elements of the differential mechanism in direct driving relation.

5. Apparatus of the class described, comprising in combination a first device driven by a first engine unit and a second device independently driven by a second engine unit, a power dividing mechanism having two driven elements and a driving element interposed therebetween, transmission connections operatively connecting one of the driven elements to one of said devices and the other driven element to the other device, means whereby the driving element may simultaneously drive both of the driven elements regardless of variations in operating speed of the driven elements, and a third engine unit adapted to operate the driving element.

6. Apparatus of the class described, comprising in combination a first device driven by a first engine unit and a second device independently driven by a second engine unit, a power dividing mechanism having two driven elements and a driving element interposed therebetween, transmission connections operatively connecting one of the driven elements to one of said devices and the other driven element to the other device, means whereby the driving element may simultaneously drive both of the driven elements regardless of variations in operating speed of the driven elements, means to connect the driven elements in direct driving relation, and a third engine unit adapted to operate the driving element.

7. Apparatus of the class described, comprising in combination a first device driven by a first engine unit and a second device independently driven by a second engine unit, a dual fluid coupling of the kinetic type having two independently rotatable runners driven from a common impeller member, transmission connections between one of the runners and one of said devices and between the other runner and the other device, and a third engine unit adapted to drive said impeller member.

8. Apparatus of the class described, comprising in combination a first device driven by a first engine unit and a second device independently driven by a second engine unit, a dual fluid coupling of the kinetic type having two independently rotatable runners driven from a common impeller member, transmission connections between one of the runners and one of said devices and between the other runner and the other device, a third engine unit adapted to drive said impeller member, and selective means to connect the runners in direct driving relation.

9. Apparatus of the class described, comprising in combination: a pair of driven devices, a pair of engine units, transmission connections whereby each engine unit may individually drive one of said devices, a power dividing mechanism driven by a third engine unit and adapted to supplement the power of the other engine units, said mechanism including a pair of relatively rotatable elements each operatively connected to drive one of said driven devices, said mechanism also including a third element driven from the third engine unit, and means whereby rotation of the third element serves to drive the first and second elements at variable relative speeds for compensating for cyclic variations in speed of operation of the driven devices.

10. In a drilling rig having a pair of reciprocating pumps and three engine units, the improvement comprising in combination: power transmission connections whereby a first engine unit may individually drive one of said pumps, additional power transmission connections whereby a second of said engine units may individually drive the other of said pumps, a power dividing mechanism driven by the third engine unit and adapted to supplement the power of the other engine units, said mechanism including a pair of relatively rotatable elements each operatively connected to drive one of said pumps, said mechanism also including a third element driven from the third engine unit, and means whereby rotation of the third element serves to drive the first and second elements at variable relative speeds for compensating for cyclic variations in the speed of operation of the pumps.

11. In a drilling rig having a pair of driven devices and three engine units, the improvement comprising in combination: power transmission connections whereby a first engine unit may individually drive one of said driven devices, additional power transmission connections whereby a second of said engine units may individually drive the other of said driven devices, a differential drive mechanism having three elements, the first element thereof being operatively connected to drive one of the driven devices, the second element thereof being operatively connected to drive the other driven device, and power transmission connections connecting the third engine unit to drive the third element of the differential mechanism, whereby the power of the third engine unit may be divided to supplement that of the other engine units.

12. In a drilling rig having a pair of driven devices and three engine units, the improvement comprising in combination: power transmission connections whereby a first engine unit may individually drive one of said driven devices, additional power transmission connections whereby a second of said engine units may individually drive the other of said driven devices, a dual fluid coupling of the kinetic type having two independently rotatable runners driven from a common impeller member, power transmission connections between one of the runners and one of the driven devices and between the other runner and the other driven device, and additional transmission connections whereby the third engine unit may drive said impeller member.

13. Apparatus of the class described, comprising in combination a first device driven by a first engine unit and a second device independently driven by a second engine unit, a power dividing mechanism having two driven elements and a driving element interposed therebetween, transmission connections operatively connecting one of the driven elements to one of said devices and the other driven element to the other device, means whereby the driving element may simultaneously drive both of the driven elements regardless of variations in operating speed of the driven elements, a third engine unit adapted to operate the driving element, and releasable means for connecting the third engine unit in direct driving relationship with one of the other engine units.

14. Apparatus of the class described, comprising in combination a first device driven by a first engine unit and a second device independently driven by a second engine unit, a power dividing mechanism having two driven elements and a driving element interposed therebetween, transmission connections operatively connecting one of the driven elements to one of said devices and the other driven element to the other device, means whereby the driving element may simultaneously drive both of the driven elements regardless of variations in operating speed of the driven elements, a third engine unit adapted to operate the driving element, and releasable means for connecting the third engine unit in direct driving relationship with either of the other engine units, or both.

15. Apparatus of the class described, comprising in combination a first device driven by a first engine unit and a second device independently driven by a second engine unit, a dual fluid coupling of the kinetic type having two independently rotatable runners driven from a common impeller member, transmission connections between one of the runners and one of the said devices and between the other runner and the other device, a third engine unit adapted to drive said impeller member, and releasable means for connecting the third engine unit in direct driving relationship with one of the other engine units.

16. Apparatus of the class described, comprising in combination a first device driven by a first engine unit and a second device independently driven by a second engine unit, a dual fluid coupling of the kinetic type having two independently rotatable runners driven from a common impeller member, transmission connections between one of the runners and one of the said devices and between the other runner and the other device, a third engine unit adapted to drive said impeller member, and releasable means for connecting the third engine unit in direct driving relationship with either of the other engine units, or both.

17. For use in a drilling rig having a pair of driven devices and three engine units, the improvement comprising in combination power transmission connections whereby a first engine unit may individually drive one of said driven devices, additional power transmission connections whereby a second engine unit may individually drive the other driven device, a power dividing mechanism including a rotary shaft and a pair of independently rotatable elements mounted coaxially of the shaft, the first element being operably connected to drive one of the driven devices and the second element being operatively connected to drive the other driven device, a third element fixed relative to the shaft, means whereby a third engine unit may drive the shaft, and means whereby rotation of said third element serves to drive the first and second elements at variable relative speeds, whereby the power of the third engine unit may be divided to supplement that of the other engine units.

18. For use in drilling rig having a pair of driven devices and three engine units, the improvement comprising in combination: power transmission connections whereby a first engine unit may individually drive one of said driven devices, additional power transmission connections whereby a second engine unit may individually drive the other driven device, a power dividing mechanism including a rotary shaft and a pair of independently rotatable elements mounted coaxially of the shaft, the first element being operatively connected to drive one of the driven devices and the second element being operatively connected to drive the other driven device, said mechanism including a dual fluid coupling of the kinetic type having two independently rotatable runners driven from a common impeller member fixed relative to said shaft, means operatively connecting each of said runners to one of said elements, means whereby a third engine unit may drive the shaft whereby the power of the third engine unit may be guided to supplement that of the other engine units.

19. For use in a drilling rig having a pair of driven devices and three engine units, the improvement comprising in combination power transmission connections whereby a first engine unit may individually drive one of said driven devices, additional power transmission connections whereby a second engine unit may individually drive the other driven device, a power dividing mechanism including a rotary shaft and a pair of independently rotatable elements mounted coaxially of the shaft, the first element being operatively connected to drive one of the driven devices and the second element being operatively connected to drive the other driven device, said mechanism including a differential drive device having a pair of driven gears each connected to one of said elements, means whereby a third engine unit may drive the shaft, a spider fixed to the shaft, pinions on the spider meshing with said gears whereby rotation of the shaft serves to drive the gears at variable relative speeds, whereby the power of the third engine unit may be divided to supplement that of the other engine units.

20. In combination with a pair of positive displacement pumps adapted for individual operation or series flow relation, a driving shaft adapted to be connected to a source of power, a pair of driven shafts adapted to be connected respectively to said pumps, a differential gear set connecting said three shafts, and selectively operable means for connecting said driven shafts in a fixed driving relation to each other.

21. In combination with a pair of positive displacement pumps adapted for individual operation or series flow relation, a driving shaft adapted for connection to a source of power, a pair of driven shafts, means for connecting the driven shafts respectively to the pumps, and a differential gear set connecting said three shafts, said differential and connecting means providing torque ratios between the driving shaft and the pumps which will enable both pumps to develop approximately the same pressure when they are connected in parallel or each pump develops approximately the same pressure rise when they are connected in series.

22. In combination, a pair of positive displacement pumps connected in series flow relation, a driving shaft, a pair of driven shafts connected respectively to said pumps for operating the same, a differential gear set comprising a pair of coaxial gear members connected by and meshing with planet gears, and a cage member journaled coaxially with said gear members and supporting said planet gears, said three members being connected respectively to said three shafts so that the torque delivered to the two pumps is maintained in balance.

References Cited in the file of this patent

UNITED STATES PATENTS

| Number | Name | Date |
|---|---|---|
| 2,026,709 | Sheldon | Jan. 7, 1936 |
| 2,243,156 | Howe et al. | May 27, 1941 |
| 2,282,597 | Archer | May 12, 1942 |
| 2,468,107 | Powell | Apr. 26, 1949 |
| 2,488,069 | Spalding | Nov. 15, 1949 |
| 2,541,625 | Webster | Feb. 13, 1951 |

FOREIGN PATENTS

| Number | Country | Date |
|---|---|---|
| 118,488 | Austria | July 10, 1930 |
| 607,874 | Great Britain | Sept. 7, 1948 |